(12) United States Patent
Jecker et al.

(10) Patent No.: US 9,174,676 B2
(45) Date of Patent: Nov. 3, 2015

(54) METHOD FOR EXECUTING AN AT LEAST SEMI-AUTONOMOUS PARKING PROCESS OF A VEHICLE AND PARKING ASSISTANCE SYSTEM FOR A VEHICLE

(75) Inventors: Nicolas Jecker, Esslingen (DE); Oliver Grimm, Flein (DE); Tobias Geiger, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 249 days.

(21) Appl. No.: 13/321,249

(22) PCT Filed: Jun. 7, 2010

(86) PCT No.: PCT/EP2010/003407
§ 371 (c)(1),
(2), (4) Date: Nov. 18, 2011

(87) PCT Pub. No.: WO2010/139486
PCT Pub. Date: Dec. 9, 2010

(65) Prior Publication Data
US 2012/0072067 A1  Mar. 22, 2012

(30) Foreign Application Priority Data
Jun. 5, 2009 (DE) .......................... 10 2009 024 083

(51) Int. Cl.
*B62D 15/02* (2006.01)
(52) U.S. Cl.
CPC ................................. *B62D 15/0285* (2013.01)
(58) Field of Classification Search
CPC ......... B60T 8/1755; B60T 8/172; B60T 7/22; B60W 10/184; B60W 10/18; B60W 30/06; B60W 301/18036; B60W 50/16; B60W 30/09; B60W 30/095; B60W 2050/143; B60W 2520/06; B60W 2550/308; B62D 15/0285; F02D 11/04; G08G 1/166; B60Q 1/48

USPC ..................... 701/70, 93, 36; 340/435, 425.5; 180/179, 170, 175, 167, 199, 204; 303/125, 135, 3
See application file for complete search history.

(56) References Cited

U.S. PATENT DOCUMENTS 5,450,057 A * 9/1995 Watanabe ...................... 340/435
6,070,682 A * 6/2000 Isogai et al. ................... 180/167
(Continued)

FOREIGN PATENT DOCUMENTS

DE  10 2005 037 468 A1  2/2007
DE  10 2007 055 391 A1  5/2009
(Continued)

OTHER PUBLICATIONS

International Search Report issued in PCT/EP2010/003407, mailed on Nov. 2, 2010, with translation, 4 pages.
(Continued)

*Primary Examiner* — James Trammell
*Assistant Examiner* — James E Stroud
(74) *Attorney, Agent, or Firm* — Osha Liang LLP (57) ABSTRACT

The invention relates to a method for executing an at least semi-autonomous parking process of a vehicle (13) by means of a parking assistance system (15), in which ambient conditions of the vehicle (13) are sensed as it travels past a potential parking space (3), and a parking path is determined as a function of the ambient conditions and of the parking space (3), wherein the ambient conditions comprise at least one obstacle (18, 18', 18") which is external to the parking space and does not directly bound the parking space (3) and is detected as near to the vehicle and is taken into account in the determination of the parking path (3), wherein the parking process is executed in a plurality of maneuvers (26, 27, 29; 34, 38, 39), and at least one maneuver (26, 27, 29; 34, 38, 39) which is executed with an autonomous steering intervention is determined in terms of its profile as a function of the obstacle (18, 18', 18"). The invention also relates to a parking assistance system (15) for a vehicle (13).

17 Claims, 2 Drawing Sheets

(56) References Cited

U.S. PATENT DOCUMENTS

| | | | |
|---|---|---|---|
| 6,784,791 B2* | 8/2004 | Rao et al. | 340/435 |
| 7,343,803 B2* | 3/2008 | Triebl et al. | 73/632 |
| 7,385,486 B2* | 6/2008 | Danz et al. | 340/435 |
| 7,739,008 B2* | 6/2010 | Cieler et al. | 701/36 |
| 8,056,667 B2* | 11/2011 | Moshchuk et al. | 180/169 |
| 8,077,202 B2* | 12/2011 | Okamoto et al. | 348/148 |
| 8,169,340 B2* | 5/2012 | Oyobe et al. | 340/932.2 |
| 8,330,818 B2* | 12/2012 | Cheng et al. | 348/148 |
| 2005/0264432 A1* | 12/2005 | Tanaka et al. | 340/932.2 |
| 2007/0021888 A1* | 1/2007 | Ephraim | 701/41 |
| 2007/0282499 A1* | 12/2007 | Maeda et al. | 701/41 |
| 2008/0027627 A1* | 1/2008 | Ikeda et al. | 701/117 |

FOREIGN PATENT DOCUMENTS

| | | |
|---|---|---|
| EP | 1 755 921 B1 | 2/2009 |
| JP | 2001-018821 A | 1/2001 |
| WO | 2005/118339 A1 | 12/2005 |
| WO | 2007/031 379 A1 | 3/2007 |

OTHER PUBLICATIONS

Office Action issued in Japanese Patent Application No. 2012-513513, mailing date Dec. 24, 2013, with English translation thereof (4 pages).

Search report issued in German Patent Application No. 10 2009 024 083.7, mailing date Jun. 7, 2010, with English transition thereof (7 pages).

* cited by examiner

METHOD FOR EXECUTING AN AT LEAST SEMI-AUTONOMOUS PARKING PROCESS OF A VEHICLE AND PARKING ASSISTANCE SYSTEM FOR A VEHICLE

The invention relates to a method for executing an at least semi-autonomous parking process of a vehicle by means of a parking assistance system, wherein ambient conditions of the vehicle are sensed as it travels past a potential parking space, and a parking path is determined as a function of the ambient conditions and of the parking space. Furthermore, the invention relates to a parking assistance system for a vehicle.

When the vehicle is parking in parking spaces, it may be found that not only the components which bound the parking space can in themselves be critical with respect to a collision, but also obstacles which impede the parking process may also be located outside the parking space.

EP 1 755 921 B1 discloses a method and a device for assisting a parking process for a vehicle. The parking space is sensed by means of a sensor arrangement on the vehicle as the vehicle travels past the parking space, wherein as the vehicle travels past the parking space a distance from an obstacle on the longitudinal side of the vehicle facing away from the parking space is measured. A parking path which is to be followed by the vehicle during the parking process is determined by taking into account at least this measured distance from the obstacle on the longitudinal side of the vehicle facing away from the parking space. The parking process is to be executed in one manoeuvre. A potential collision of the vehicle with the obstacle which is arranged on the longitudinal side facing away from the parking space is signaled to the driver and the driver can abort the parking process before the collision.

In the known method, a parking path is therefore predefined which is not designed such that it can prevent a collision with an obstacle arranged outside the parking space. If such a situation is brought about during the single-manoeuvre parking, the parking process must, as it were, be aborted. This is not very user-friendly and not convenient, since the driver has already prepared to park his vehicle in the parking space.

The object of the present invention is to make available a method for executing an at least semi-autonomous parking process of a vehicle and a parking assistance system in which or with which a parking process in which obstacles which do not bound the parking space are also present in the near surroundings outside the parking space and nevertheless under these conditions user-friendly and convenient execution of the parking process is made possible.

This object is achieved by means of a method which has the features according to Claim 1 and a parking assistance system which has the features according to Claim 15.

In a method according to the invention, an at least partially semi-autonomous parking process of a vehicle into a parking space is executed, wherein this is executed by means of a parking assistance system of the vehicle. In the method, ambient conditions of the vehicle are sensed as the vehicle travels past a potential parking space before an actual parking process is executed, and if appropriate a suitable parking space is detected. If a parking space is detected as being suitable, a parking path is determined as a function of the ambient conditions, which comprise at least one obstacle which is external to the parking space and does not directly bound the parking space, and characteristic variables of the parking space itself. The parking process is executed in a plurality of manoeuvres, and at least one manoeuvre which is executed with an autonomous steering intervention is determined in terms of its profile as a function of an obstacle which is external to the parking space and does not directly bound the parking space. In particular, in this respect account is taken of ambient conditions which are present around the vehicle outside the parking space and adversely affect the parking process such that the parking path is determined differently under these ambient conditions from the parking path which would be determined without these ambient conditions which are outside the parking space and do not bound the parking space.

In a semi-autonomous parking process the driver is assigned the role of opening the throttle and braking. Steering and therefore locking of the steerable wheels of the vehicle is executed automatically and therefore independently of the driver or the steering is executed by the driver, and the electronic parking assistance system informs the driver, by means of acoustic and/or optically and/or haptically perceivable signals, which steering actions he has to execute, on the basis of a parking path which is determined by the system.

As a result of the parking process being executed in a plurality of manoeuvres, the parking path is also composed of a plurality of manoeuvres. A profile of the at least one manoeuvre which is executed with an autonomous steering intervention is characterized, in particular, by the length of this manoeuvre and the geometry thereof, which can be characterized, for example, by arcuate paths, and these can in turn be characterized by the direction of curvature and the curvature per se.

With the method it therefore becomes possible that convenient and user-friendly execution of a parking process is also made possible on the basis of difficult ambient conditions outside the parking space. The parking path is preferably therefore already determined at the start of the parking process by taking into account the ambient conditions in such a way that it is ensured that the vehicle can be parked or removed from a parking space in a collision-free fashion. The restriction according to which a parking process must firstly be started and, if appropriate, has to be aborted again owing to a risk of a collision therefore does not apply as in the prior art. The present invention permits precisely this to be avoided, with the result that it is ensured that the parking process can be executed in a substantially more user-friendly and convenient fashion. In particular, before the parking process is started the parking path is therefore determined such that it is also possible to execute parking in a plurality of manoeuvres in a collision-free fashion with respect to the obstacles which are arranged near to the vehicle and outside the parking space and the obstacles which do not primarily bound the parking space. In particular, the ambient conditions therefore comprise obstacles outside the parking space and boundaries which do not directly restrict the parking space, with the result that these obstacles are relatively near to the vehicle and require planning of the parking path which is different from that required if these obstacles which are external to the parking space were not present.

Furthermore, these obstacles which are external to the parking space and which are to be included among the ambient conditions cannot be easily driven around by the vehicle without difficulty. Such obstacles are therefore, for example, walls, other vehicles, boundary posts. Low obstacles or obstacles which are near to the ground and which could be driven over by the vehicle, such as is the case, for example, with kerbstones, cannot readily be included among these obstacles. In the case of such obstacles it is possible to provide, in particular, that they can be sensed and detected by the parking assistance system, in particular by one or more sensors of the parking assistance system. Depending on the specific configuration of such an obstacle it is then possible to decide whether or not it adversely affects the parking process, and can therefore be driven over if appropriate. In particular in the case of kerbstones it is possible to provide in this respect that depending on a detectable height and/or contour it is possible to detect whether they can be driven over without difficulty during the parking process or whether a category of such a kerbstone is present with which a collision or driving over should be avoided. This is in particular the case under certain circumstances when the kerbstone is relatively high and is formed with a relatively sharp edge at the transition between the upper side and the side wall. If this transition is round or relatively flat, driving over may be possible in this respect without damage being able to occur to the vehicle.

In particular in the case of such obstacles which, depending on their configuration, should not be driven over or else can also be driven over, it is possible to provide that an image recording is also provided by a detector unit which is sensitive in the spectral range which is visible to humans, for example an optical camera, and that this is indicated to the driver. If appropriate, on the basis of information provided by the parking assistance system it is possible to transfer to the driver the decision as to whether or not this obstacle is to be driven over. Depending on this decision by the driver, the system can then determine the specific and collision-free parking path.

At least two manoeuvres of the parking process or of the parking path are preferably executed with an autonomous steering intervention and at least one of the manoeuvres is determined in terms of its profile as a function of the specific obstacles which are external to the parking space. As a result of this configuration, the determination of the parking path is made variable such that a wide variety of situations relating to the parking space in question and the ambient conditions can be allowed for. The parking path can therefore be made even more variable and flexible in respect of its determination with the result that collision-free parking can be improved even further. In particular, this additional increase in the configuration possibility of the parking path ensures that the number of parking spaces with critical ambient conditions in which it is not actually possible to park can be significantly reduced even further.

Preferably, a manoeuvre of the parking path which is executed with an autonomous steering intervention is determined in terms of its profile as a function of the specific obstacles which are external to the parking space and a further manoeuvre which is executed with an autonomous steering intervention is determined as a function of the other manoeuvre. This also increases the variability and flexibility of the configuration of a parking path and the possibility of parking in different parking spaces with parking-space-external ambient conditions which are critical for the execution of the parking process is thereby increased. In particular, it is possible to provide that the further manoeuvre which is executed with an autonomous steering intervention is determined at least or only as a function of the other manoeuvre in which the specified obstacles which are external to the parking space and which do not directly bound the parking space are taken into account in the determination of the profile.

Reverse parking of the vehicle into a parking space is preferably executed as a parking process. In particular, the vehicle is parked into a transverse parking space. A transverse parking space is understood to be a parking area for a vehicle which laterally adjoins a carriageway and whose longitudinal axis is oriented at an angle which is larger than 0° and smaller than 180° with respect to the longitudinal axis of the carriageway. This is preferably understood to refer to parking areas whose longitudinal axis runs at an angle between 30° and 150° with respect to the longitudinal axis of the carriageway. In particular, parking spaces whose longitudinal axis is oriented perpendicularly with respect to the longitudinal axis of the carriageway are assumed to be referred to.

In particular, an ambient condition which impedes the unimpeded parking process with an obstacle which is external to the parking space and does not indirectly bound the parking space is characterized in that a carriageway which adjoins the parking space is bounded in the driving direction by a first obstacle and/or is bounded on the longitudinal side of the vehicle facing away from the parking space, when said vehicle is still on the carriageway, for example before the start of the parking process, by a second obstacle. Specific ambient conditions are therefore created such that it is possible to position outside the parking space, in the forward direction viewed from the vehicle which is to be parked and/or on the longitudinal side of the vehicle facing away from the parking space, one or more obstacles which have a restrictive effect on the parking process compared to a parking process if these obstacles were not present.

A first obstacle can be, for example, a wall in an underground car park or some other kind of car park. Furthermore, such an obstacle can also be a boundary post of a car park with a large area and a large number of parking spaces or another vehicle or the like. Basically, this first obstacle can, in particular, be conceived of such that it cannot or should not be driven over by the vehicle which is to be parked. The same applies to the second obstacle which can be embodied in a corresponding way with respect to the specific particulars which are to be understood as exemplary and not conclusive.

The method is provided, in particular, for a multi-manoeuvre parking process, in particular a reversing parking process.

With respect to the assessment of ambient conditions which are to be restricted in such a way, a configuration is preferably provided according to which the system can assess these critical ambient conditions with the obstacles which are external to the parking space in such a way that a first distance of the first obstacle from a lateral boundary of the parking space facing the first obstacle is smaller than or equal to 1.5 times the length of the vehicle which is to be parked, in particular smaller than the length of the vehicle.

Furthermore, in a further advantageous refinement there is provision in this respect that a second distance of the second obstacle from a boundary which faces the second obstacle and separates the parking space from the carriageway is less than 1.5 times the length of the vehicle which is to be parked, in particular less than the length of the vehicle. In particular obstacles which are positioned in such a manner relatively near to the vehicle which is to be parked restrict free space substantially during the execution of the parking process compared to when they are not present. The invention is particularly advantageous for being able to park in the free parking space also particularly in such situations. By means of the customary dimensions and possible lock angles of steerable wheels of the vehicle, particularly in an environment with the specified area boundaries, it is particularly important to be able to correspondingly adapt the parking path in this respect for a collision-free parking process. In this respect, the execution of a collision-free parking process and process of leaving the parking space is also made possible on the one hand, by a multi-manoeuvre parking process and, on the other hand, by the adaptation of at least one manoeuvre during which an autonomous steering intervention is executed, and determining this manoeuvre as a function of these specifically mentioned obstacles which are external to the parking space and do not directly bound the parking space.

There is preferably provision for the method by which during a parking process the vehicle which executes the parking process is positioned before the start of the parking process with a longitudinal direction at an angle which is, in particular, larger than 40° and smaller than 130°, with respect to a longitudinal direction of the parking space, and the parking process is executed in three manoeuvres.

In such an initial situation, the second and preferably, in particular, at least the second manoeuvre and the third manoeuvre are preferably executed with an autonomous steering intervention, wherein during the second manoeuvre the steerable wheels of the vehicle are locked in a first direction, and during the third manoeuvre the steerable wheels are locked in a second direction which is opposed to the first direction. There is therefore provision, depending on the ambient conditions, that the second and/or the third manoeuvre are determined in terms of their lengths and their path geometry as a function of the ambient conditions.

The first manoeuvre of this three-manoeuvre parking path is preferably also executed with an autonomous steering intervention. This first manoeuvre can also be executed linearly. In the case of linear travel, it is also possible to provide that this is then executed with an active steering system. It is also possible to provide that in a specific situation of this type the first manoeuvre is not executed by means of an autonomous steering intervention but is instead executed in a driver-dependent fashion. An autonomous steering intervention is in fact not necessary and also not provided in the case of linear travel of this type.

There is preferably provision that the first manoeuvre is also executed in a rearward direction and at least partially in a non-linear fashion, wherein in particular a movement with an autonomous steering intervention is then also executed here. In the case of such a refinement, the travel along the three-manoeuvre parking path is executed completely with one autonomous steering intervention.

In particular it is possible to provide that following the first manoeuvre further manoeuvres, specifically the second manoeuvre and/or the third manoeuvre, are determined as a function of the first manoeuvre, in particular as a function of the length and path geometry thereof. In this respect it is therefore also possible for different conditions to be included in the determination of the individual manoeuvres of the parking path, wherein the most suitable parking path can be determined very precisely and on a situation-specific basis. It is therefore possible for a parking process into a parking space which is in principle suitable with respect to its length and width to take place even under very restricted spatial conditions.

It is also possible to provide that, before the parking process starts, the vehicle is positioned with its longitudinal direction at an angle which is, in particular, larger than 40° and smaller than 130°, with respect to a longitudinal direction of the parking space, and the parking process is executed in three manoeuvres. Before the parking process starts, a maximum possible veering out distance of the vehicle during the parking process, in particular of a reference area of the vehicle, is determined. The parking process relates here to the travel with an autonomous steering intervention. Further movements of the vehicle can be executed both beforehand and afterwards by means of a driver-dependent steering intervention in order, for example, to move the vehicle to the starting position of the parking process or to move it into the final parked position after the three manoeuvres which are executed with the autonomous steering intervention. It is possible to provide that after the veering out distance has been determined and, in particular, a suitable starting position for the parking process is determined as a function thereof, the driver is informed of this, with the result that the driver can move the vehicle into this position. It therefore may be necessary, for example, that the vehicle on the basis of the position in which the data acquisition relating to the parking space and the veering out distance etc. has taken place is not the most suitable for starting the parking process. The system signals this and proposes the starting position and guides the driver with the vehicle to that location. For example, compared to the position of the vehicle when the distances from the obstacles were measured, a starting position may be better further forward, for example several meters further forward, when viewed in the direction of travel.

In a situation-specific refinement of the first manoeuvre of this type, the starting position of the vehicle is therefore, as it were, delayed in order to plan the first reversing manoeuvre to be as flat as necessary. Additionally or instead of this it is also possible to provide that depending on the determined maximum permissible veering out distance when executing the parking process the second manoeuvre is minimized in terms of its length, so that the vehicle has the smallest possible lateral space requirement. It is also possible to provide that the length of a first manoeuvre of the parking process and/or the length of a second manoeuvre of the parking process are determined as a function of the veering out distance. In addition to the geometry profile, the length is therefore also determined as a further parameter of these manoeuvres as a function of a specific parameter, specifically the veering out distance, which has been determined in such a manner in advance.

With respect to a first manoeuvre which is as flat as possible, this is considered in comparison with a first manoeuvre in which the first and/or second obstacles which are external to the parking space and which characterize the ambient conditions would not be present. In comparison with such freedom of movement without this first and/or second obstacle, the first manoeuvre is conceived with such obstacles and therefore with a relatively large radius, that is to say a relatively small curvature. Furthermore, preferably the second manoeuvre is shorter and extends less far forward than the second manoeuvre without these first and/or second obstacles which are near to the vehicle and external to the parking space.

The maximum veering out distance is preferably formed as a function of a distance between two reference areas of obstacles which are located on opposite sides of the longitudinal sides of the vehicle to be parked. The veering out distance is determined so as to be smaller than this distance, wherein smaller means in particular that the veering out distance is determined so as to be at a minimum smaller than the distance, which ensures maximum possible utilization of this free space during parking, and nevertheless a collision with these obstacles is avoided. The veering out distance can preferably be in an interval between 10 cm and greater than 0 cm and smaller than the distance between the obstacles. The veering out distance therefore indicates, before the parking process, in particular the free space which is located to the side of the vehicle, in which space the vehicle can then move during the parking process without colliding.

The veering out distance is preferably an absolute veering out distance, which means that the distance between an obstacle which bounds the parking space and a parking-space-external obstacle which is formed on the longitudinal side of the vehicle facing away from the parking space is used as the basis, and the veering out distance is smaller than this distance. If, in this respect, two obstacles are arranged opposite one another, the direct distance between them is determined and the absolute veering out distance is determined so as to be smaller than this distance, wherein reference is made to the above statements in respect of it being smaller.

The veering out distance can also be a relative veering out distance which, starting from the actual starting position of the vehicle at the start of the parking process smaller than a distance between the vehicle, in particular a specific area of the vehicle, to an obstacle, in particular a parking-space-external obstacle which is located on the side of the vehicle facing away from the parking space.

It is possible to provide that a maximum veering off distance of the second reference area is determined as a function of the position of the vehicle, in particular of a first reference area of the vehicle, relative to the parking space and/or relative to the second obstacle, and a distance of a second reference area of the vehicle, facing away from the parking space, with respect to the second boundary of the parking space. Before the parking process is executed, it is therefore determined to what extent this second reference area of the vehicle can veer out to the maximum extent in order to be able to avoid a collision with an obstacle which is near to the vehicle and external to the parking space when executing the parking process.

The first reference area of the vehicle can be determined by a plurality of points on the vehicle. The precise position of said reference area can be determined on the basis of the known vehicle data, such as geometry data and the like and a known position of one or more sensors arranged on the vehicle. A coordinate system in which the individual vehicle components are known in terms of their positions is preferably assigned to the vehicle. As a result, the distance between two or more components can be determined and as a result the position of the reference area with respect to these external obstacles etc. can be determined as a function of distances from obstacles or the like measured with the sensors on the vehicle.

The second reference area is determined, in particular, in a situation-dependent fashion. In this context, preferably the position of the vehicle relative to an obstacle which is external to the parking space is taken into account. The second reference area of the vehicle is located here in particular at the location of the vehicle which, with respect to the given position of the vehicle before the parking process and on the basis of the specific parking process which is to be executed, constitutes the exposed position with respect to a possible collision with the parking-space-external obstacles. It is therefore possible to provide, for example, in the case of reverse parking the vehicle into a transverse parking space which is located to the side of the vehicle, the left-hand or right-hand front corner region of the vehicle constitutes this second reference area.

In this embodiment on the longitudinal side of the vehicle facing away from the parking space in a first manoeuvre of the parking process an arcuate path is preferably travelled along and the curvature of the arcuate path is determined as a function of the previously determined maximum veering out distance. Here too, allowance is therefore made specifically for the ambient conditions outside the parking space and a quite specific manoeuvre, namely the first manoeuvre, is determined as a function of a quite specific characteristic variable, namely the veering out distance.

In this way it is also possible to provide a geometry and length of the first manoeuvre which are adapted in a particularly specific way to the given situation.

In a refinement of the first manoeuvre which is situation-specific in this way, the starting position of the vehicle is therefore, as it were, delayed in order to plan the first reversing manoeuvre to be as flat as necessary. In addition or instead of this it is also possible depending on the specific maximum permissible veering out distance when executing the parking process for the second manoeuvre to be minimized in terms of its length, with the result that the vehicle has a minimum lateral space requirement. It is also possible to provide that the length of a first manoeuvre of the parking process and/or the length of a second manoeuvre of the parking process are determined as a function of the veering out distance. In addition to the geometry profile, the length is therefore also determined as a further parameter of these manoeuvres as a function of a specific parameter, namely the veering out distance, which has been determined in advance in such a way.

With respect to a first manoeuvre which is as flat as possible, this is considered in comparison with a first manoeuvre in which the parking-space-external first and/or second obstacles which characterize the ambient conditions would not be present. Compared to such freedom of movement without this first and/or second obstacle, the first manoeuvre is therefore conceived with such obstacles with a relatively large radius, that is to say a relatively small curvature. Furthermore, the preferably second manoeuvre is shorter and extends less far forward than the second manoeuvre without these first and/or second obstacles which are near to the vehicle and external to the parking space.

The multi-manoeuvre travel is executed in such a way that during reverse parking the first manoeuvre constitutes reversing, the second manoeuvre constitutes forward travel and the third manoeuvre again constitutes reversing of the vehicle.

In particular, the ambient conditions and the characteristic variables of the parking space, in particular their depth and their width, as well as the position of the vehicle relative to the parking space both before and during the parking process are sensed by suitable sensors of the parking assistance system. In particular, in this respect ultrasonic sensors are provided which are designed both for sensing surroundings located in front of the vehicle as well as for sensing surroundings located behind the vehicle, as well as for sensing surroundings to the side of the vehicle. The vehicle can in this respect have distance sensors which can sense the distance of obstacles from the vehicle. Furthermore, the vehicle can comprise travel sensors by means of which the distance travelled on a parking path can be determined. Furthermore, the vehicle can have one or more steering angle sensors and/or one or more yaw rate sensors or the like. These sensors can then obtain and determine information about the parking space, information about the position of the vehicle with respect to the parking space before the parking process and also during the parking process, as well as the position of the vehicle in relation to the obstacles which bound the parking space, as well as with respect to obstacles which are external to the parking space.

In particular, there is also provision that the specific parking path with its plurality of manoeuvres can, if appropriate, be modified during the execution of the parking process. At least one plausibility check of this previously determined parking path is executed while the parking path is being travelled along. If the actual conditions deviate from the setpoint conditions by more than a predefinable tolerance range, corrections of the parking path can be executed on the basis of the conditions relating to the position of the vehicle relative to the parking space etc. which are still preferably continuously sensed during the parking process.

Furthermore, the invention relates to a parking assistance system for executing an at least partially semi-autonomous parking process of a vehicle. The parking assistance system comprises a detector device by means of which ambient conditions of the vehicle are sensed as it travels past a potential parking space, in particular before the execution of the parking process and a parking path is determined as a function of obstacles which are covered by the ambient conditions, are external to the parking space, do not directly bound the parking space and are detected as being near to the vehicle, and of the parking space by means of a control and evaluation unit of the parking assistance system. The parking process is formed from a plurality of manoeuvres, and at least one manoeuvre which is executed with an autonomous steering intervention, executed by the parking assistance system, onto a steering device of the vehicle is determined in terms of its profile as a function of the ambient conditions. The profile comprises in this respect both the length and the geometry of the manoeuvre.

The detector device of the parking assistance system comprises, in particular, a plurality of sensors by means of which the surroundings of the vehicle, the position of the vehicle with respect to obstacles in the surroundings, the position of the vehicle in relation to a parking space and in relation to the boundaries thereof as well as geometry data of the parking space can be acquired. This information can be generated in conjunction with known and stored vehicle data such as length, width, wheelbase.

Advantageous embodiments of the method according to the invention can be considered to be advantageous embodiments of the parking assistance system according to the invention and respectively of the parking assistance device according to the invention. The parking assistance system is, in particular, a parking aid system for executing parking processes.

Further features of the invention emerge from the claims, the figures and the description of the figures. The features and feature combinations specified above in the description and the features and feature combinations which are mentioned below in the description of the figures and/or shown alone in the figures can be used not only in the respectively specified combination but also in other combinations or alone without departing from the scope of the invention. In particular, features or feature combinations of explained exemplary embodiments can therefore be combined with one another and as a result new exemplary embodiments, which are also covered by the disclosure, can be generated.

Exemplary embodiments of the invention will be explained in more detail below on the basis of schematic drawings, in which.

Identical and functionally identical elements are provided with the same reference symbols in the figures.

Figure 1:
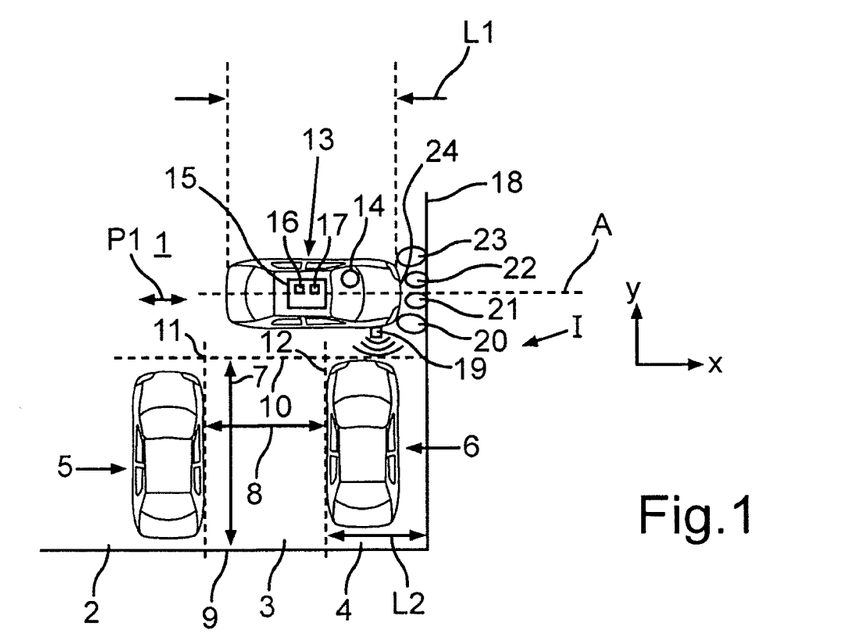
FIG. 1 is a schematic plan view of a first parking situation before parking occurs.

FIG. 1 shows a first traffic situation I in a schematic plan view. For example, this can be in a multi-story car park or an underground car park or an open, large-area car park with a plurality of parking possibilities for vehicles. However, these are only exemplary details for a traffic situation I.

A carriageway 1 is adjoined directly by a plurality of transverse parking spaces 2, 3 and 4. The carriageway can be travelled along in the direction of the arrow P1, and the longitudinal axis of this carriageway 1 is oriented horizontally in the x direction. The parking spaces 2 to 4 are embodied in this respect as transverse parking spaces, which in the present case means that their longitudinal directions or their longitudinal axes are oriented in the y direction and are therefore perpendicular with respect to the longitudinal axial orientation of the carriageway 1.

A first vehicle 5 is parked in the parking space 2, wherein a second vehicle 6 is parked in the parking space 4. The parking space 3 is still free and possible for parking in. The parking space 3 has a depth 7 and a width 8. The depth 7 is dimensioned here from a reverse boundary 9, which is, for example, a wall, up to the front boundary 10, which is, for example, also virtual. The parking space 3 is separated from the carriageway 1 by the boundary 10. The boundary 10 can be formed in a virtual fashion by the front sides of the vehicles 5 and/or 6. The width 8 extends between the boundaries 11 and 12, wherein in this respect the boundaries 11 and 12 are merely shown schematically. In this context it can be dimensioned between the longitudinal sides of the vehicles 5 and 6 which face one another, but can also be dimensioned between boundary markers on the ground.

A vehicle 13, which is a two-axial and four-wheeled motor vehicle, is to be parked in the transverse parking space 3. In the exemplary embodiment there is provision that reverse parking is executed in three manoeuvres, wherein in all three manoeuvres an autonomous steering intervention into a steering device 14 of the vehicle takes place. For this purpose, the vehicle 13 comprises an electronic parking assistance device or an electronic parking assistance system 15 which has a control and evaluation unit 16 and a memory unit 17. Furthermore, the vehicle 13 comprises a plurality of sensors, wherein in this respect distance sensors, travel sensors, steering angle sensors, yaw rate sensors etc. are mentioned by way of example. The position of the vehicle 13 relative to the parking space 3 and the position of the vehicle 13 relative to the boundaries 9, 10, 11 and 12 of the parking space 3 and the position of the vehicle 13 with respect to further ambient conditions of the vehicle can be determined by means of the information which is detected by at least some of these sensors and the vehicle data stored in the storage device 17, for example the length, width, wheel base, and positions of sensors and components of the vehicle in a vehicle coordinate system and the like. In particular, in the case of the further ambient conditions obstacles which are external to the parking space are therefore provided, which obstacles, moreover, do not directly bound the parking space 3 either. Such an obstacle 18 is, for example in FIG. 1, a further wall which bounds the carriageway 1 in the forward direction and extends transversely with respect thereto in the direction of travel of the vehicle 13. The obstacle 18 is so high that it cannot be driven over by the vehicle 13. In addition to a refinement as a continuous high wall, for example as a wall of an underground garage, the obstacle 18 can also be one or more posts or the like. The obstacle 18 therefore comprises all the possible embodiments which do not permit the vehicle 13 to drive over it or do not ensure that this occurs without damage to the vehicle 13.

Merely by way of example an ultrasound sensor 19 is mentioned in the illustration in FIG. 1, said ultrasound sensor 19 being positioned front right and on the side of the vehicle and being able to sense the lateral area around the vehicle 13. Furthermore, merely by way of example sensing areas 20, 21, 22 and 23 are illustrated symbolically and are each assigned to a further ultrasound sensor on the front side 24 of the vehicle and are designed to detect the surroundings in front of the vehicle. Of course, the sensing areas 20 to 23 also overlap and the merely symbolic illustration is not to be understood as meaning that areas which are not sensed or cannot be sensed are located between them.

The vehicle can have corresponding refinements at the rear as well as corresponding sensors for sensing the lateral surroundings on the two opposite longitudinal sides of the vehicle 13.

The vehicle 13 has a length L1 and in the embodiment shown according to FIG. 1 before the starting of the parking process it is positioned with its longitudinal axis A substantially parallel to the longitudinal axis of the carriageway 1.

The boundary 12 of the parking space 3 facing the obstacle 18 is arranged at a distance L2 therefrom in the exemplary embodiment shown. As is apparent, this distance L2 is smaller than the length of the vehicle L1. This obstacle 18 has to be taken into account in parking the vehicle 13 in the parking space 3. The parking path which is provided for parking in the parking space 3 therefore has to be determined differently by the parking assistance system 15 compared to the path which would be provided and determined if there were no obstacle 18 which restricts the parking process and is external to the parking space.

The parking process for parking in the parking space 3 is predefined by the parking assistance system 15 in a plurality of manoeuvres, with the result that the parking path is embodied in multiple manoeuvres. In particular, for this purpose a three-manoeuvre parking process is predefined. In the exemplary embodiment, all three manoeuvres are executed with an autonomous steering intervention into the steering device 14, wherein for this purpose steerable front wheels of the vehicle 13 are actuated and activated automatically by means of the control unit 16 and corresponding actuators.

At least one manoeuvre of the three-manoeuvre parking path is determined as a function of these ambient conditions, in particular the obstacle 18. In the traffic situation I according to FIG. 1, the space which is available in front of the vehicle 13 is therefore considerably restrictive, which is taken into account during the determination of the parking path for parking in the parking space 3.

The information about the parking space 3, which was acquired when the vehicle 13 travelled past the parking space 3, is also taken into account for the parking path. Furthermore, the position of the vehicle 13 with respect to the parking space 3 before the parking process is executed is determined and is taken into account for the determination of the parking path. Furthermore, the position of the vehicle 13 with respect to the boundaries 10, 11 and 12 is also taken into account for the determination of the parking path, and the position of the vehicle 13 with respect to the obstacle 18 and with respect to the vehicles 5 and 6 is also taken into account. In the exemplary embodiment shown in FIG. 1, merely a first obstacle 18 is therefore external to the parking space, and the parking space 3 is not provided so as to be directly adjacent, which first obstacle 18 is, however, arranged near to the vehicle 13 with respect to the parking process to be executed and has to be taken into account for the determination of the parking path of this obstacle 18. Near to the vehicle means in particular that the obstacle is nearer than 1.5 times, in particular nearer than one times the length of the vehicle 13 to be parked with respect to the parking space.

The parking assistance system 15 therefore determines, as a function of at least some of the above-mentioned information, a three-manoeuvre parking path which permits the parking in the parking space 3 to be executed in a collision-free fashion and without having to abort the parking process. The three-manoeuvre parking process is executed to the effect that a first manoeuvre is executed in the reverse direction, a subsequent second manoeuvre in the forward direction is executed and a further subsequent third manoeuvre in the reverse direction is executed.

FIG. 1 shows the situation in which the vehicle 13 has reached its standing position, and then starts directly with the parking process at this starting position. This parking process is then illustrated in more detail in the schematic plan view in FIG. 2, and is correspondingly explained below.

Starting from the starting position shown in FIG. 1, the vehicle 13 moves in reverse and then reaches the position 25. The first manoeuvre 26 which is indicated by the arrow is then executed starting from the starting position shown in FIG. 1. The first manoeuvre is therefore travelled along in reverse with a slightly arcuate path with active steering, wherein the length and the geometry of the first manoeuvre 26 are also determined as a function of the position of the obstacle 18 with respect to the vehicle 13 according to the starting position shown in FIG. 1. In the exemplary embodiment, this first manoeuvre 26 is made relatively short, with the result that the rear of the vehicle 13 is still located in front of the position of the longitudinal axis of the vehicle 5 viewed in the x direction. Starting from this slightly oblique position which is reached, a second manoeuvre 27 is then executed in the forward direction, in which the vehicle 13 is shown on its end position 28 in FIG. 2. Starting from the wheels which are locked to the right in the first manoeuvre 26, an automatic lock of the steerable wheels compared to the normal or straight-out position to the left is then executed, and with this steering lock this second manoeuvre 27 is executed until the end position 28 at the end of the second manoeuvre 27 is reached. Starting from this position 28, a third manoeuvre 29 in the reverse direction is then executed, in which the steerable wheels are again automatically locked to the right compared to the normal position until the vehicle has reached the end position 30, which represents the end of the third manoeuvre 29. In this end position 30, the longitudinal axis A of the vehicle 13 is oriented parallel or substantially parallel to the longitudinal axis of the parking space 3. The vehicle 13 can then be moved into the parking space 3 through further reverse travel into the end position. As a result of this specific parking path with a plurality of manoeuvres, complete parking without collision is achieved, wherein only a minimum amount of space is necessary in the forward direction owing to the situation-specific conditions of the parking process, and the conditions with the first obstacle 18 are therefore allowed for.

At this point it is emphasized that with a corresponding strategy it is also possible to determine a parking path with which parking in the parking space 4 would be possible, if the latter were free, starting from the position of the vehicle 13 shown in FIG. 1.

Figures 3, 4:
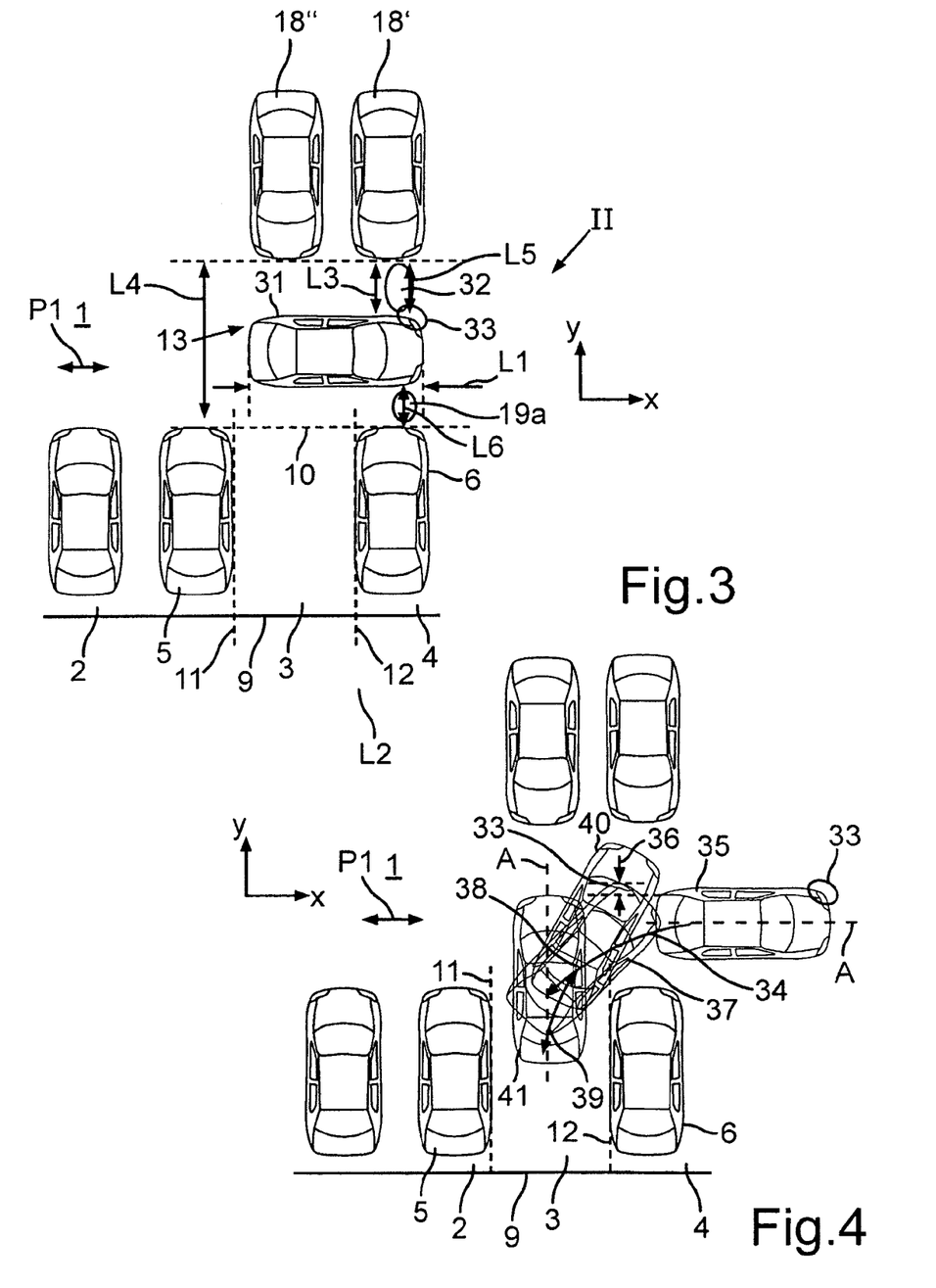
FIG. 3 shows a schematic plan view of a second parking situation before the execution of the parking process.
FIG. 4 shows a schematic plan view of the parking situation according to FIG. 3 with a schematically illustrated parking process.

FIG. 3 shows a further traffic situation II in a schematic plan view. In this refinement, there is, in contrast to the illustration according to FIG. 1, no provision of an obstacle 18 which is formed in the frontal direction with respect to the vehicle, but instead there are obstacles 18' and 18" which are positioned adjacent to a longitudinal side 31 of the vehicle 13 which faces away from the parking space 3. In the exemplary embodiment, said obstacles 18' and 18" which are external with respect to the parking space 3 which is to be parked in and do not directly bound this parking space 3 are parked vehicles. However, it is also possible here, for example, for another refinement to be provided, for example in the form of a wall or of posts. The obstacles 18' and 18" are arranged and positioned in the near surrounding area of the vehicle 13. In this case, these obstacles 18' and 18" are detected by a further distance sensor on the left-hand front sides in the region of the vehicle 13, wherein in this respect only the sensing region 32 of this sensor is illustrated symbolically. Moreover, a sensing region 19*a* of the right-hand front, laterally detecting sensor 19 is also shown, by means of which the distance of the vehicle 13 from the parked vehicle 6 can be sensed. Here too, obstacles 18' and 18" are therefore positioned to the side of the vehicle 13 in the region near to the vehicle and are taken into account in the determination of the parking path with respect to their distance from the vehicle 13. Here too, a distance L3 is smaller than the length L1 of the vehicle 13. The parking path which is to be determined for parking in the parking space 3 also differs, in the traffic situation II according to FIG. 3, in turn from that which would be determined by the parking assistance system 15 if these obstacles 18' and 18" were not present. This means that the obstacles 18' and 18" are at least so near to the vehicle 13 that a parking strategy which is provided without these obstacles 18' and 18" has to be changed.

Figure 2:
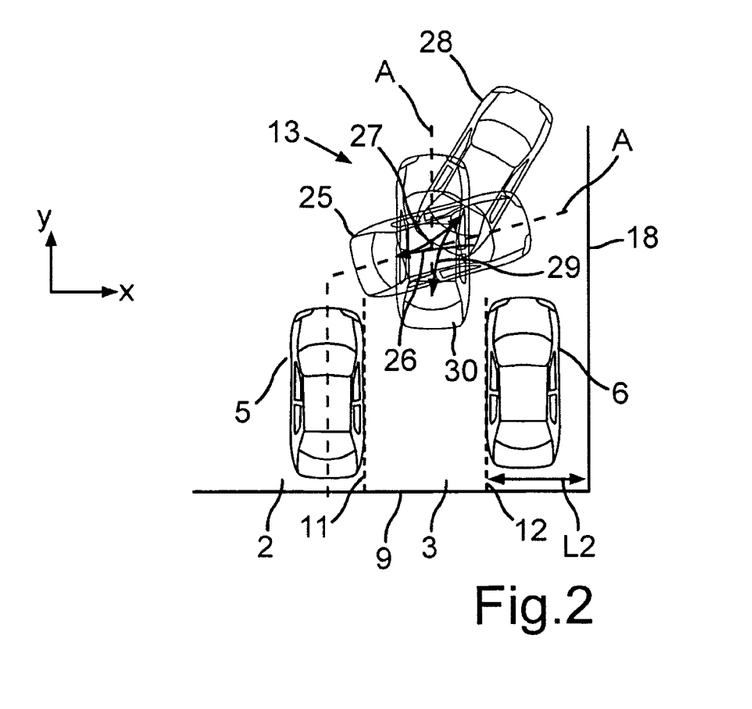
FIG. 2 shows a plan view of the parking situation according to FIG. 1 with the schematic plan of a parking process.

Here too, the parking assistance system 15 determines a situation-specific parking path as a function of the information which has already been mentioned with respect to the exemplary embodiment explained in FIGS. 1 and 2. Here too, the parking process is executed with a parking path in three manoeuvres, wherein reverse parking of the vehicle 13 into the parking space 3 takes place.

A distance L4 is dimensioned between the obstacle 18' and/or the obstacle 18" and the vehicle 6, in particular the shortest distance therebetween.

In the traffic situation II which is predefined here, a maximum possible absolute veering out distance is determined during the execution of the parking process. This distance is determined, in particular, as a function of the information relating to the position shown for the vehicle 13 before the start of the parking process in FIG. 3.

In the exemplary embodiment, the distance is determined here between the vehicle 6 and the obstacle 18', wherein this is done as a function of the distance information of the sensors arranged laterally at the front of the vehicle 13. The distance L5 of the vehicle 13, in particular of the sensor with the sensing area 32, with respect to the obstacle 18' and a distance L6 between the vehicle 13, in particular the sensor 19, and the vehicle 6, are determined here. Since the width of the vehicle 13 and, in particular, the distance between the two front sensors which are arranged on opposite longitudinal sides of the vehicle 13 is known, the distance L4 between the vehicle 6 and the obstacle 18' can be determined. The maximum absolute veering out distance is then somewhat smaller, in particular within an interval between 10 cm and larger than 0 cm, smaller, depending on this distance L4.

Depending on this maximum permissible absolute veering out distance, the starting position of the vehicle 13 is delayed during the execution of the parking process, in particular during the first manoeuvre, in order to plan the first reversing manoeuvre or the first manoeuvre to be as flat as necessary and/or to minimize a second manoeuvre with respect to its length, with the result that the vehicle 13 has to take up as little lateral space, i.e. space in the direction with respect to the obstacles 18' and 18" starting from the situation shown in FIG. 3. This delay means that the vehicle 13 still has to travel a distance in the forward direction starting from the position in FIG. 3 in order to reach the better starting position for the parking process. This starting position 35 is then shown in FIG. 4. The driving from the position in FIG. 3 to the starting position 35 is implemented by the driver himself and no autonomous steering intervention takes place, with the result that this movement is also not included in the actual parking process during which an autonomous steering intervention is executed during three manoeuvres.

FIG. 4 then shows the parking process, wherein on the basis of the illustration in FIG. 3 the starting position 35 for starting the parking process is reached by virtue of the fact that in the exemplary embodiment a certain distance is still travelled linearly in the forward direction. This is shown in the illustration in FIG. 4, in which the vehicle 13 has still moved forward by approximately half the vehicle length and has assumed the starting position 35. The movement from the position in FIG. 3 to the starting position is signaled to the driver, preferably by the parking assistance system 15, or the driver receives instructions as to how he arrives at the starting position 35. For this purpose it is possible to provide that m this is indicated acoustically and/or optically and if appropriate he receives instructions as to how far he has to drive. As has already been mentioned, a first manoeuvre 34 with an autonomous steering intervention is then executed starting from this starting position 35, wherein the curvature of this first manoeuvre 34 is relatively small, and therefore the radius is relatively large. As a result, a very flat arcuate curved path is travelled along, and it is therefore ensured that a specific reference area 33 at an end position 37 of the first manoeuvre 34, which is dependent on the respective traffic situation or parking situation, in the direction of the obstacles 18' and 18" has only come slightly nearer, by a distance 36, compared to the starting position 35. In the embodiment shown, the reference area 33 is the left-hand front corner area of the vehicle 13.

Starting from this end position 37 of the first manoeuvre 34, forward travel is then executed in a second manoeuvre 38, which is very short compared to the first manoeuvre 34 and a third manoeuvre 39. In the exemplary embodiment shown, the steerable front wheels are locked to the right, starting from the straight-ahead normal position, in the first manoeuvre 34, wherein in the second manoeuvre 38 the wheels are then locked to the left beyond the normal position. The vehicle 13 also moves on an arcuate path along the second manoeuvre 38, and then reaches the end position 40 at the end of the second manoeuvre 38. Starting from this end position 40 which is reached, the third manoeuvre 39 is then executed in reverse, wherein the steerable wheels are then locked again here automatically, again to the right via the normal position starting from the locked leftward direction in the second manoeuvre 38, and the vehicle 13 reaches an end position 41 at the end of the third manoeuvre 39. Here too, at this end position 41 the orientation of the longitudinal axis A of the vehicle 13 is substantially parallel or completely parallel to the longitudinal axis A of the parking space 3, and therefore extends in the y direction.

The length and/or the profile, and therefore the curvature, of the first manoeuvre 34 and/or the length and/or the curvature of the second manoeuvre 38, are determined as a function of this maximum permissible absolute veering out distance. As a result, even in this traffic situation II multiple-manoeuvre parking into the parking space 3 can be made possible without collisions and semi-autonomously during all the manoeuvres. Here too, the parking process does not have to be aborted since the collision-free overall parking path is determined before the start of the parking process.

The invention claimed is:

1. A method for executing an at least semi-autonomous parking process of a vehicle using a parking assistance system, the method comprising:
 sensing ambient conditions of the vehicle as the vehicle travels past a potential parking space using and ultrasonic sensor; and
 determining one parking path, using a control and evaluation unit, as a function of the ambient conditions, of the parking space, and at least one of: a lock angle of a steering wheel of the vehicle, a length of the vehicle, a width of the vehicle, a height of the vehicle, and a ground clearance of the vehicle, wherein the ambient conditions comprise at least one obstacle which is external to the parking space and does not directly bound the parking space, and wherein the at least one obstacle is detected as near to the vehicle and is taken into account in the determination of the parking path using the control and evaluation unit, wherein a first manoeuvre is executed with an autonomous steering intervention determined using the control and evaluation unit in terms of a corresponding profile as a function of the obstacle, and wherein a second manoeuvre is executed with the autonomous steering intervention determined using the control and evaluation unit in terms of a corresponding profile as a function of the obstacle and the first manoeuvre.

2. The method according to claim 1, wherein a plurality of additional manoeuvers are executed to complete the parking process.

3. The method according to claim 1, wherein reverse parking is executed as the parking process.

4. The method according to claim 1, wherein the vehicle is parked into a transverse parking space.

5. The method according to claim 4, wherein a carriageway which adjoins the parking space is bounded in a driving direction by at least one first obstacle and is bounded on a longitudinal side of the vehicle facing away from the parking space by at least one second obstacle.

6. The method according to claim 5, wherein a first distance of the at least one first obstacle from a lateral boundary of the parking space which faces the at least one first obstacle is less than or equal to 1.5 times a length of the vehicle.

7. The method according to claim 6, wherein a second distance of the at least one second obstacle from a boundary which faces the at least one second obstacle and separates the parking space from the carriageway is less than 1.5 times the length of the vehicle.

8. The method according to claim 6, wherein, before the parking process starts, the vehicle is positioned with the vehicle's longitudinal direction at an angle which is larger than 40° and smaller than 130°, with respect to a longitudinal direction of the parking space, and wherein the parking process is executed in three manoeuvres comprising the first manoeuvre, the second manoeuvre, and a third manoeuvre.

9. The method according to claim 8, wherein the third manoeuvre is executed with the autonomous steering intervention, wherein during the second manoeuvre, steerable wheels of the vehicle are locked in a first direction, and during the third manoeuvre, the steerable wheels are locked in a second direction which is opposed to the first direction.

10. The method according to claim 1, wherein the parking path is determined so that the parking process is executed in a collision-free fashion in three manoeuvres which are executed with the autonomous steering intervention, and wherein the parking process is not started if a collision-free parking path cannot be determined.

11. The method according to claim 7, wherein, before the parking process starts, the vehicle is positioned with the vehicle's longitudinal direction at an angle which is larger than 40° and smaller than 130°, with respect to a longitudinal direction of the parking space, wherein before the parking process starts a maximum possible veering out distance during the parking process is determined as a function of a distance between two obstacles of the vehicle which are detected near the vehicle on and on opposite sides of the vehicle.

12. The method according to claim 11, wherein in a first manoeuvre of the parking process an arcuate path is travelled along and a curvature of the arcuate path is determined as a function of the maximum possible veering out distance.

13. The method according to claim 12, wherein a length of the first manoeuvre of the parking process and a length of the second manoeuvre of the parking process are determined as a function of the maximum possible veering out distance.

14. A parking assistance system for executing an at least semi-autonomous parking process of a vehicle, comprising:

an ultra-sonic sensor for sensing ambient conditions of the vehicle as the vehicle travels past a potential parking space, wherein the ambient conditions comprise at least one obstacle which is external to the parking space, does not directly bound the parking space, and is detected as being near the vehicle; and a control and evaluation unit for determining one parking path at least as a function of the at least one obstacle, of the parking space, and at least one of: a lock angle of a steering wheel of the vehicle, a length of the vehicle, a width of the vehicle, a height of the vehicle, and a ground clearance of the vehicle, wherein a first manoeuvre is executed with an autonomous steering intervention, by the parking assistance system, onto a steering device of the vehicle is determined in terms of a corresponding profile as a function of the at least one obstacle, and wherein a second manoeuvre is executed with the autonomous steering intervention by the parking assistance system, onto the steering device of the vehicle is determined in terms of a corresponding profile as a function of the at least one obstacle and the first manoeuvre.

15. The parking assistance system according to claim 14, wherein a plurality of additional manoeuvers are executed to complete the parking process.

16. A method for executing an at least semi-autonomous parking process of a vehicle using a parking assistance system, the method comprising:

sensing ambient conditions of the vehicle as the vehicle travels past a potential parking space using and ultra-sonic sensor; and determining one parking path without human input from a driver, using a control and evaluation unit, as a function of the ambient conditions, of the parking space, and at least one of: a lock angle of a steering wheel of the vehicle, a length of the vehicle, a width of the vehicle, a height of the vehicle, and a ground clearance of the vehicle, wherein the ambient conditions comprise at least one obstacle which is external to the parking space and does not directly bound the parking space, and wherein the at least one obstacle is detected as near to the vehicle and is taken into account in the determination of the parking path using the control and evaluation unit, wherein a first manoeuvre is executed with an autonomous steering intervention determined using the control and evaluation unit in terms of a corresponding profile as a function of the obstacle, and wherein a second manoeuvre is executed with the autonomous steering intervention determined using the control and evaluation unit in terms of a corresponding profile as a function of the obstacle and the first manoeuvre.

17. The method according to claim 16, wherein a plurality of additional manoeuvers are executed to complete the parking process.

\* \* \* \* \*